455-608 AU 233 EX [redacted]

FIP8106 XR 2,651,715

Sept. 8, 1953 M. E. HINES 2,651,715

CHANNEL SEPARATION LIGHT FILTER

Filed Dec. 29. 1949 2 Sheets-Sheet 1

INVENTOR
M. E. HINES
BY Hugh S. Wertz
ATTORNEY

INVENTOR
M. E. HINES
BY Hugh S. Wertz
ATTORNEY

Patented Sept. 8, 1953 2,651,715

UNITED STATES PATENT OFFICE 2,651,715

CHANNEL SEPARATION LIGHT FILTER

Marion E. Hines, Summit, N. J., assignor to Bell Telephone Laboratories, Incorporated, New York, N. Y., a corporation of New York Application December 29, 1949, Serial No. 135,770

5 Claims. (Cl. 250—7)

This invention relates to a system of signaling by modulated light beams and, more particularly, to a communication system which utilizes an optical link in the transmission path.

In the continuing search for more economical methods of transmitting information, wide band communication systems are being developed which are capable of combining a large number of messages into a single signal for transmission. Pulse code modulation and time division multiplexing are among the techinques used. In a preferred embodiment, this invention makes use of these tools in a communication system which includes an optical cable.

In accordance with the invention, light is transmitted by a direct beam between a transmitting and a receiving station. In a preferred embodiment, a cylindrical pipe serves as the optical cable, though the primary function thereof is to protect the beam from atmospheric conditions, rather than to act as a wave guide. In one embodiment, a system of lenses is included which makes feasible transmission between distant points with a minimum of loss by wall absorption.

An object of this invention is to provide transmission over such an optical cable.

By analogy with telephone carrier system, a number of channels may be transmitted simultaneously through the same optical cable if different bands of non-overlapping wavelengths of light be used. With pulse code modulation and multiplexing, the number of messages which can be simultaneously transmitted in this way might be greater than with microwave systems using wave guides.

Another object is to maximize the number of channels that can be transmitted over such an optical cable.

In the past, one important problem which has seriously impaired the practicability of a communications system by means of modulated light beams, has been the unavailability of an inexpensive means for transmitting as a single beam a very large number of light signals of very sharply defined wavelength bands. A corollary problem has been to find an easy and inexpensive method for separating out the individual components of the very many channels that would necessarily need to be transmitted over a single cable if such a system is to compete favorably with its purely electrical analogue.

To this end, principal features of the invention are arrangements of lenses and prisms which provide a simple and inexpensive, yet very satisfactory, solution to all these difficulties.

In accordance with the invention, there is provided a channel separator for the segregation of a broad band of wavelengths into component non-overlapping bands, and a channel integrator which combines beams of non-overlapping bands from a plurality of light sources into a single broad band beam.

The invention will be better understood from the following description taken in connection with the accompanying drawings forming a part thereof, in which.

Figure 1:
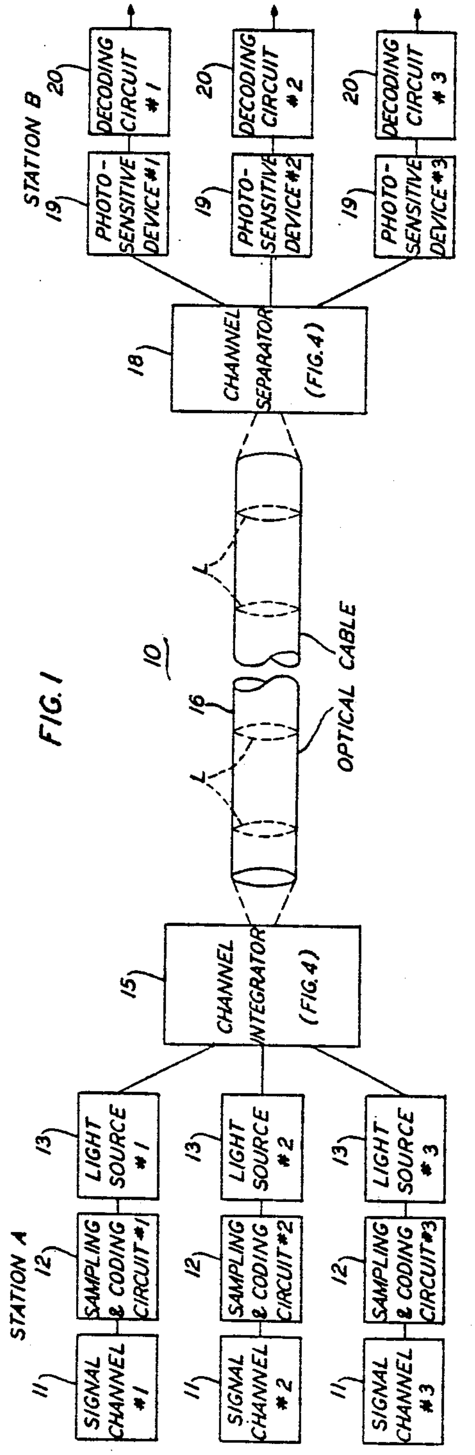
Fig. 1 is a communication system, in accordance with the invention, of which a portion is an optical cable.

Fig. 1 shows an illustrative embodiment 10 of a communication system in accordance with the invention. The signal intelligence is supplied by a multiplicity of signaling channels 11 to sampling and coding circuits 12 to be transformed into a pulse code in a manner well known in the art and each coded signal therefrom, which consists of a series of on-off pulses, actuates an associated light source 13. Each of these sources 13 transmits light of a narrow band in the wavelength spectrum, and the individual bands are characterized in that there is no overlapping between any two. Thereafter, the light from these separate sources 13 is combined into a single beam of broad band by the channel integrator 15, hereinafter to be described. The output thereof is thereafter supplied to the optical cable 16 for transmission. The optical cable 16 extends between the two stations A and B. more or less widely separated. Along this cable 16, are distributed a multiplicity of lenses L, positioned to minimize the absorption losses therealong, in a manner to be hereinafter more fully described. At the receiving station B, the single beam is separated into its original components by a channel separator 18, also to be described hereinafter. The separate beams of light pulses are then supplied to individual photosensitive means 19 to be converted into electrical pulses which are applied to associated decoding circuits 20 to produce facsimiles of the original signals in a manner well known in the art. Where transmission between distant points is desired, repeater stations may be used to regenerate similar light pulses when the energy of the transmitted pulse becomes marginally weak, and optical systems, similar to the one herein described, may be used in series to traverse the desired distance. Moreover, individual signals may be separated out at one terminal station and others sent on to succeeding stations. In these respects, the operation is similar to that in an ordinary carrier telegraph or telephone communication system. Moreover, by the use of bands of differing wavelengths in the two directions, simultaneous two-way transmission is possible.

Certain difficulties may be expected in connection with the transmission path. In a preferred embodiment, the optical cable is a long and ordinary pipe. The pipe need not act as a wave guide but is intended primarily to protect the beam from atmospheric conditions. The pipe must therefore be laid straight by sections. Mirrors may be used to pass light around bends and a suggested arrangement therefor is hereinafter described in connection with Fig. 2. In a straight long pipe, any tendency to bend the beam by even a small fraction of a degree may eventually result in no reception at the opposite end. Therefore, temperature differences between sections of the pipe may result in a refraction of the beam if the pipe contains a gas. This effect might be minimized if the pipe were buried for its entire length. Another expedient to meet this problem would be to partially evacuate the pipe or fill it with a gas having a low index of refraction, such as helium or hydrogen.

There is considerable advantage in making the pipe as large as is economically feasible. The received power increases as the fourth power of the radius thereof, assuming only the inverse square loss, when lenses are not distributed along the cable. Also, the effects of wall absorption, refraction, and vibrations will be reduced by a larger pipe diameter, together with a reduction in the requirements of straightness.

Figures 2, 4:
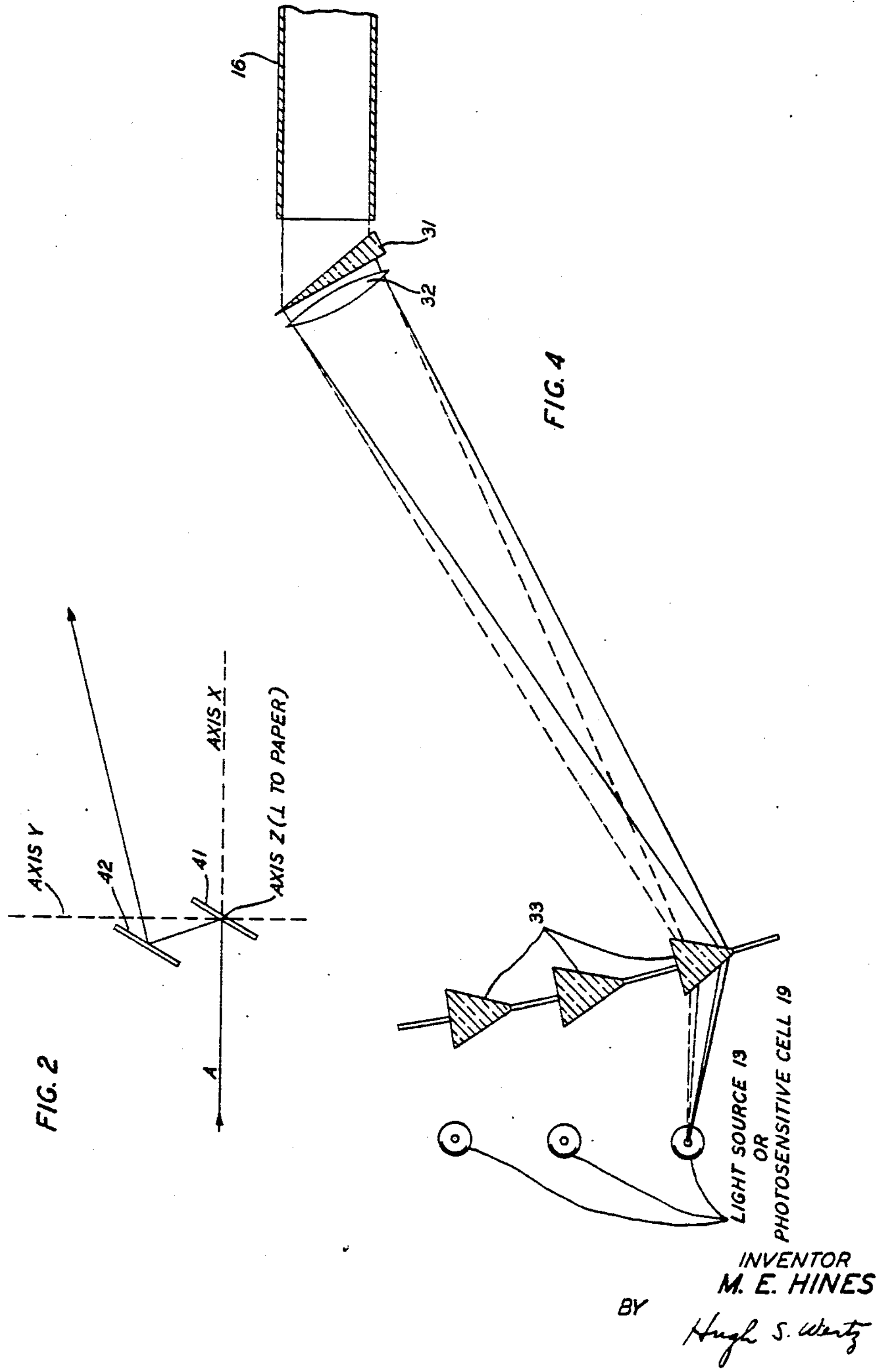
Fig. 2 illustrates a detail of the system of Fig. 1, relating to bends in the optical cable.
Fig. 4 illustrates, in accordance with the invention, an arrangement for a channel separator which, alternatively by the minor change indicated in the drawing, can be used instead as a channel integrator.

Fig. 2 shows a suggested arrangement of mirrors 41 and 42 so that light may pass through bends in the pipe. The accuracy required in maintaining the angular orientations of the mirrors is very great. For distances on the order of 25 miles, angular displacements of the beam of a few parts per million would interrupt the signal. This does not mean, however, that each mirror must be initially adjusted to tolerances that close. Each mirror, in turn, need only be set accurately enough to give a maximum reception at the next mirror, perhaps a mile away, and accuracy of the order of thousands of an inch would be adequate. In this way, slight errors in initial settings of any one mirror may be corrected in subsequent mirror settings with completely practicable tolerances. Maintaining the settings is quite another problem. Earth movements, ground settlements, and vibrations will change these initial adjustments in time. The use of double mirrors 41 and 42, in the manner illustrated in Fig. 2, tends to cancel these effects provided that the two mirrors are mounted rigidly together as a unit. Small rotations of the unit about axes Y or Z will cause no effect, as the two rotations cancel in the final output beam. Rotation about axis X will cause some effect, but this will be small if the total angle of deviation $\theta$ is small.

Figure 3:
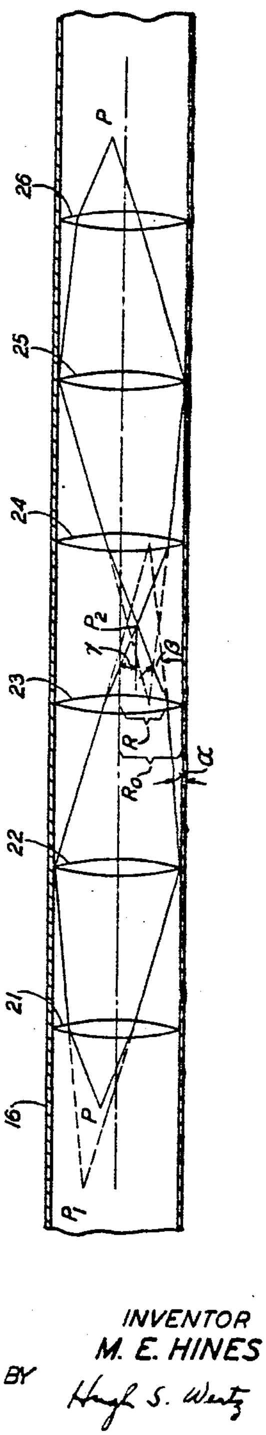
Fig. 3 illustrates an arrangement of lenses positioned along the cable for minimum absorption losses.

Fig. 3 illustrates an arrangement of lenses along the optical cable 16. It is clear that losses in transmission along the cable are introduced by wall absorption if the beam is permitted to strike the wall. By spacing thin lenses L (specifically designed in Fig. 3 by reference characters 21 to 26 inclusive) along the pipe so that the two lenses adjacent to any given lense are in its principal focal planes, this loss can be minimized considerably. If identical lenses are used, this condition requires that the lenses be spaced at the principal focal planes. For the purposes of analysis, it will be convenient to assume that all the lenses L are identical and of focal length $f_0$. Referring to Fig. 3, the first lens 21 is positioned so that its object distance from the light source P is one half the focal length $f_0$ of the lenses, so that there is a virtual image on the same side thereof at twice this distance, or $f_0$ at $P_1$. This means that the actual light source at P has a virtual image at $P_1$ of twice the actual image size. The light rays in the space between the lenses 21 and 22 are oriented so as to appear to originate from this virtual image at $P_1$. Effectively, therefore, lens 22 has an object distance corresponding to $2f_0$ and would form an image on the opposite side of $P_1$ at a distance of $2f_0$ but for the interposition of the lens 23. Instead, the lens 23 focuses this light to a real image at $P_2$ at a distance one-half $f_0$ therefrom. This actual image at $P_2$ behaves like a new light source for lenses 24 and 25 and others farther along the cable, and this process repeats itself. Assuming perfect lenses and no diffraction effects, geometrical optical considerations indicate that, for the described arrangement, all the light which reaches any given lens is passed on to the next one all the way down the pipe. To illustrate, consider the image at $P_2$, which is at some small distance off the axis of the pipe 16. The light which reaches this point can come from any part of the lens 22. Consider the limiting rays from the very edge of lens 22. Since the lenses used are thin lenses with long focal lengths, some simple relations can be written which determine the limting angle from which rays can approach $P_2$. The angle $\beta$, which is formed at the lens 23 between a limiting ray from lens 22 which is bent by action of the lens 23 and the same ray, if not so bent, depends only upon the distance R from the center of the lens 23 to the point thereof where the ray passes, according to the relation $$\beta=\frac{R}{f_0}\text{ radians}$$

The angle $\alpha$, which is formed between a limiting ray from lens 22 and the pipe wall, depends upon the distance R also, according to the relation $$\alpha=\frac{R_0-R}{f_0}\text{ radians}$$

where $R_0$ is the radius of the pipe. The angle $\gamma$, which is formed between the line through $P_2$ parallel to the axis of the pipe and the limiting ray of lens 22, as bent by lens 23, is equal to the sum of $\alpha$ and $\beta$ and is equal to $$\gamma=\alpha+\beta=\frac{R_0}{f_0}\text{ radians}$$

which is independent of the distance of the point $P_2$ from the axis, or of what point on the rim of the lens 22 the limiting ray left. Rays from any internal point on lens 22 will appreach $P_2$, forming an angle less than $\gamma$. The rays which reach $P_2$, therefore, have come from a cone of one half angle $\gamma$, whose axis is parallel to the axis of the pipe. Since the lenses 24 and 25 are symmetrically opposite to lenses 23 and 22, by symmetry considerations it is apparent that all the light which left the lens 22 to form the image point at $P_2$ will reach the lens 25 and be subsequently focused at a new image farther down the pipe. The same thing will occur at each lens, and, therefore, there is not the cumulative light loss that comes from a succession of simple lenses and images.

Fig. 4 illustrates the arrangement which is used, both at the transmitting terminal with light source 13 (as integrator 15) for integrating the plurality of beams of non-overlapping wavelength bands to a single broad band beam, and at the receiving terminal with photosensitive devices 19 (as separator 18) for separating the broad band into the original components.

Though it might be more logical to consider the transmitting equipment first, here it will be more convenient to describe the arrangement as a separator first. An optical primary prism 31, with a small color dispersion, is used to disperse a broad band beam into a spectrum band in a manner well known in the art. A converging lens 32 thereafter focuses the light of each wavelength separately, so that in the absence of anything further, the result would be a spectrum distribution of light along a line focus. However, there is interposed between the lens 32 and the focal line a plurality of secondary prisms 33, as shown. For the sake of simplicity, only three such prisms have been shown, but it will be evident that many more are equally feasible. Each of these secondary prisms 33 is placed so that it will be illuminated by light of a different non-overlapping band of wavelengths, and the nearer the secondary prisms 33 are to the focal line and the smaller they are too, the more precisely defined these bands will be. These secondary prisms 33 again bend the light which strikes them, and if they are properly designed and oriented, the light of each wavelength band is collected to a spectral convergent point image associated with each of said prisms 33 rather than along the focal line. At these point images are localized photosensitive detecting means 19 which, when energized by the light striking thereon, produce corresponding electrical signals, in a manner well known in the art. For proper focus of the light of each band to a point, it is necessary that the secondary prisms 33 have a greater dispersive power than the primary prism 31 for the type of geometry shown. If the entire band of wavelengths striking any single prism 33 is to be collected to a common point, the shorter wavelengths thereof must be bent farther than the longer wavelengths. This can be quite readily accomplished by using a primary prism 31 thin in comparison with the secondary prisms 33 or by using media of different indices of refraction therein, or in any of the other varieties of ways well known in the art.

Where lenses are distributed along the pipe, as hereinbefore discussed, the focusing function of the lens 32 can be served by one of those in the pipe, so that there will be no need in the channel separator therefor. It is sufficient that there be a lens somewhere along the light path so that the dispersed light is focused to a point at the photosensitive cells 19.

There is no particular restriction on the focal length of the converging lens used. Therefore, the distance between the primary and secondary prisms can be made very long, and the number of channels which can be accommodated is quite large, as the secondary prisms 33 and photosensitive cells 19 can be made quite small. It is apparent that such an arrangement makes possible the use of a large number of channels without interference or cross-talk. Moreover, a separator 18 of this sort will not seriously attenuate the light in any wavelength band received or transmitted by the channel assigned to this band. Moreover, each channel is not restricted to monochromatic light. This makes possible maximum utilization of the energy of the light sources. Moreover, this separator is one easily adapted for use with a concentrated light source or small photosensitive receiver.

In the foregoing description, this arrangement has been described as a separator 18 for separating out the components of non-overlapping bands for use with the photosensitive receivers 19. As pointed out above, this arrangement can be used as the device 15 for combining a plurality of light beams of non-overlapping bands into a single broad band beam for transmission along the optical cable.

Sources of light 13 are used in place of the light sensitive means 19 to serve as signaling means to be modulated in accordance with the signal information. The arrangement of Fig. 4 when operating as a integrator serves to collect, from each source, an associated band, and to combine the plurality of beams therefrom into a single broad band beam. It is a characteristic of this system that no two bands derived overlap. Each prism 33 is oriented to disperse the light of its associated source 13 so that only the light of the characteristic band thereof, illuminates lens 32, which collimates this light. The prism 31 collects these separate beams into a single broad beam which includes the component non-overlapping bands.

It is to be understood that the above-described arrangements are illustrative of the principles of the invention. Numerous other arrangements may be devised by those skilled in the art without departing from the spirit and scope of the invention.

What is claimed is:

1. A communication system comprising a plurality of light beams of non-overlapping component bands in the wavelength spectrum, means for modulating said light beams associated therewith, means for combining said beams into a single beam, an optical cable for the transmission of said beam, means at the end of said cable for separating out said component bands comprising a primary prism having a predetermined angular dispersion for dispersing said light into a spectrum band, a plurality of prisms having a greater angular dispersion than and oriented oppositely with respect to said primary prism for recombining portions of said spectrum band into a plurality of beams of said component bands.

2. A communication system comprising a plurality of sources of light beams, each adapted to be modulated in accordance with signal information, a plurality of secondary prisms, one associated with each light source for dispersing the light therefrom, a primary prism of relatively lower angular dispersion than said secondary prisms associated with said plurality of prisms positioned for receiving from each prism a beam of a different component band of frequencies, the plurality of bands being mutually exclusive in frequency, and combining the beams into a single beam, an optical cable for the transmission of the single beam, and means at the end of the cable for separating out the component bands.

3. A communication system comprising a plurality of sources of light beams, each adapted to be modulated in accordance with signal information, a plurality of secondary prisms, one associated with each light source for dispersing the light therefrom, a primary prism of relatively lower angular dispersion than said secondary prisms associated with said plurality of prisms positioned for receiving from each prism a beam of a component band of frequencies, the plurality of bands being mutually exclusive in frequency, and combining the beams into a single beam, an optical cable for the transmission of said single beam, and means at the end of said cable for separating out the component bands including a primary prism for dispersing said beam into a spectrum band of frequencies and a plurality of secondary prisms for recombining portions of said spectrum band into a plurality of beams of component bands.

4. In an optical system, an elongated optical cable, a primary prism in optical alignment with said cable, a plurality of secondary prisms of relatively higher dispersive power than said primary prism and of opposite orientation with respect thereto, said secondary prisms having different spectral convergent points, a plurality of terminal elements located at said respective convergent points, and optical means having a given focal length located in the optical path between said cable and said terminal elements at a distance from each of said terminal elements substantially equal to said focal length.

5. In an optical system, an elongated optical cable, a primary prism having a given dispersive power in optical alignment with said cable, a plurality of secondary prisms of relatively greater dispersive power than said primary prism and oppositely oriented with respect thereto, said secondary prisms having different spectral convergent points, a plurality of terminal elements located at said respective convergent points, and light converging optical means located in the optical path between said cable and said terminal elements.

MARION E. HINES.

References Cited in the file of this patent

UNITED STATES PATENTS

| Number | Name | Date |
|---|---|---|
| 984,929 | Kellner | Feb. 21, 1911 |
| 1,876,806 | Waide | Sept. 13, 1932 |
| 2,100,348 | Nicolson | Nov. 30, 1937 |
| 2,187,908 | McCreary | Jan. 23, 1940 |

FOREIGN PATENTS

| Number | Country | Date |
|---|---|---|
| 162,656 | Great Britain | May 11, 1921 |